United States Patent [19]

Jennings

[11] Patent Number: 4,656,820
[45] Date of Patent: Apr. 14, 1987

[54] ROUND BALER APRON TENSIONING SYSTEM

[75] Inventor: Richard E. Jennings, Manheim, Pa.
[73] Assignee: New Holland Inc., New Holland, Pa.
[21] Appl. No.: 860,971
[22] Filed: May 8, 1986
[51] Int. Cl.⁴ .......................... A01D 39/00; B30B 5/06
[52] U.S. Cl. ......................................... 56/341; 100/88
[58] Field of Search ...................... 56/341, 11.5, 11.7; 100/88, 89

[56] References Cited

U.S. PATENT DOCUMENTS

| 4,343,141 | 8/1982 | Oellig et al. | 56/341 |
| 4,426,833 | 1/1984 | Campbell | 56/341 |
| 4,470,247 | 9/1984 | Mast | 56/341 |

FOREIGN PATENT DOCUMENTS

| 2851035 | 6/1979 | Fed. Rep. of Germany | 56/341 |
| 2362571 | 3/1978 | France | 56/341 |
| 2045155 | 10/1980 | United Kingdom | 56/341 |
| 2079671 | 1/1982 | United Kingdom | 56/341 |

Primary Examiner—Robert Peshock
Assistant Examiner—John G. Weiss
Attorney, Agent, or Firm—Darrell F. Marquette; Frank A. Seemar; Larry W. Miller

[57] ABSTRACT

A system for tensioning the bale forming apron of a round baler includes first and second pairs of drive sprockets for moving the apron. The first pair of drive sprockets are driven at a first speed, and the second pair of drive sprockets are driven at a second speed which is slightly slower than the first speed. This differential in sprocket speeds tensions the inner course of the apron extending between the first and second pairs of drive sprockets. The system also includes a slip clutch assembly for temporarily disengaging the second pair of drive sprockets from being driven at the second speed whenever the differential between the first and second speeds reaches a preset limit.

7 Claims, 4 Drawing Figures

ROUND BALER APRON TENSIONING SYSTEM

BACKGROUND OF THE INVENTION

This invention relates generally to roll baling machines typically referred to as "round balers" which form cylindrical roll bales of crop material. In particular, this invention relates to a system for tensioning the bale forming aprons of such roll baling machines U.S. Pat. No. 4,343,141 discloses a round baler of the expandable chamber type having a bale forming apron which consists of endless chains connected together at spaced intervals along their length by transverse bars or slats. A system including coil spring assemblies connected to a pivotally mounted arm assembly tensions the bale forming apron in order to provide the necessary compression for acceptable bale formation and density. U.S. Pat. No. 4,426,833 discloses another round baler of the expandale chamber type wherein a system including air spring assemblies connected to a rotatable arm assembly tensions a bale forming apron. While the above-mentioned apron tensioning systems have been used successfully on round balers for several years, they have become increasingly expensive.

Therefore, it is an object of the present invention to provide a system for tensioning a bale forming apron of a round baler which is less expensive then the known systems using coil spring assemblies or air spring assemblies.

SUMMARY OF THE INVENTION

The tensioning system provided by the present invention includes first and second drive members for moving the bale forming apron of a round baler in a predetermined path. An inner course of the apron extends between the first and second drive members and expands in length during bale formation. The tensioning system also includes means for driving the first drive member at a first speed, and means for driving the second drive member at a second speed which is slower than the first speed in order to maintain tension in the inner course of the apron. Clutch means are also provided for disengaging the means for driving the second drive member when the differential between the first and second speeds reaches a preset limit. In the preferred embodiment of the present invention, the bale forming apron is formed of a pair of endless chains connected together at spaced intervals along their length by transverse members, and the first and second drive members comprise first and second pairs of drive sprockets, respectively, for engaging the apron chains.

DESCRIPTION OF THE INVENTION

Figure 1:
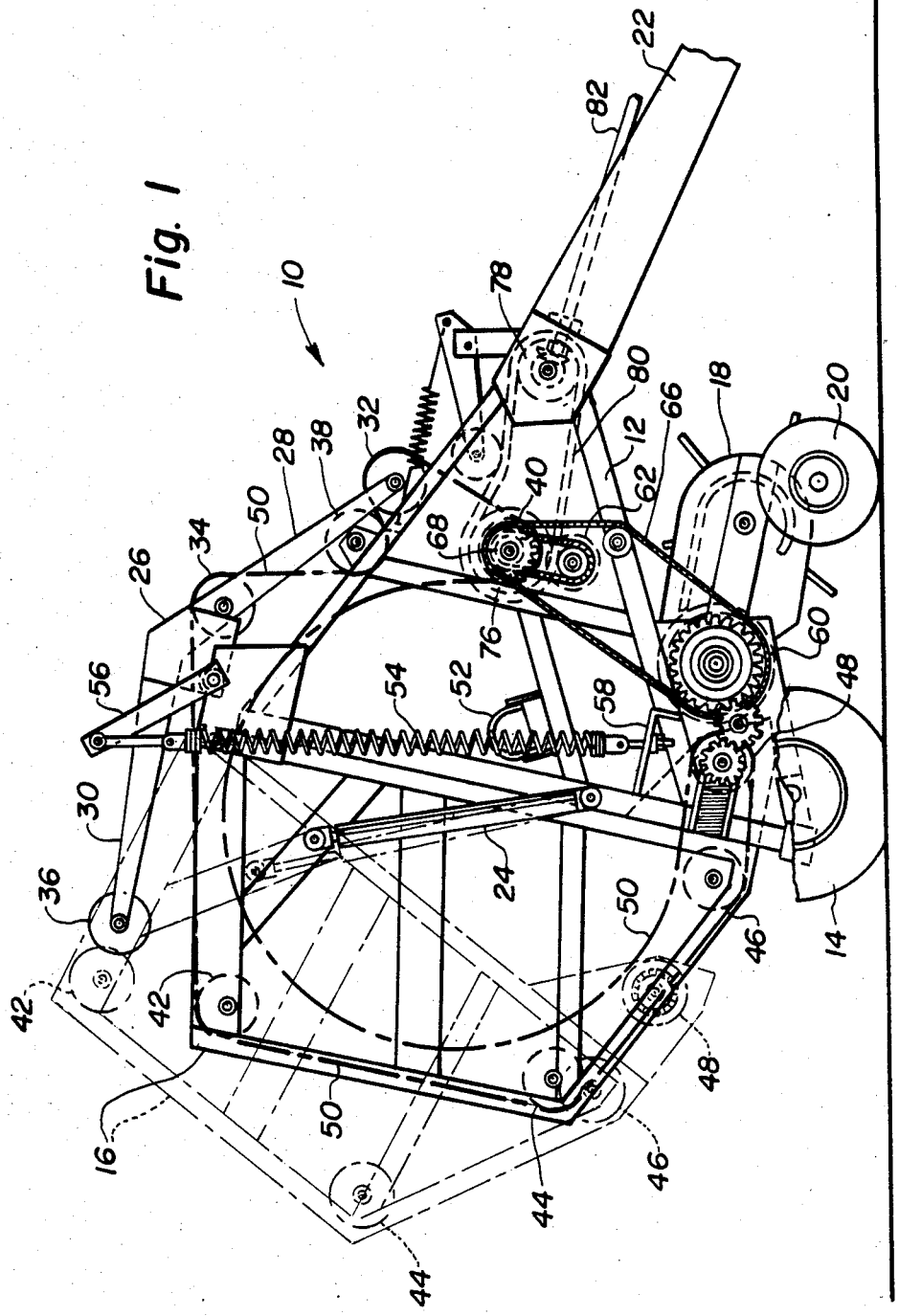
FIG. 1 is a side elevation view of a round baler incorporating the apron tensioning system of the present invention.

Referring to FIG. 1, a round baler 10 embodying the preferred embodiment of the present invention includes a base frame 12 supported by a pair of wheels 14 and an auxiliary frame 16 pivotally connected to the base frame 12 in conventional manner. A pickup device 18 supported by wheels 20 is mounted on the base frame 12, and a tongue 22 is provided on the base frame 12 for connection to a tractor. Hydraulic cylinders 24 are connected between the base frame 10 and the auxiliary frame 16 for raising and lowering the auxiliary frame 16 in known manner. Auxiliary frame 16 is shown in a partially raised position in phantom in FIG. 1.

Figure 2:
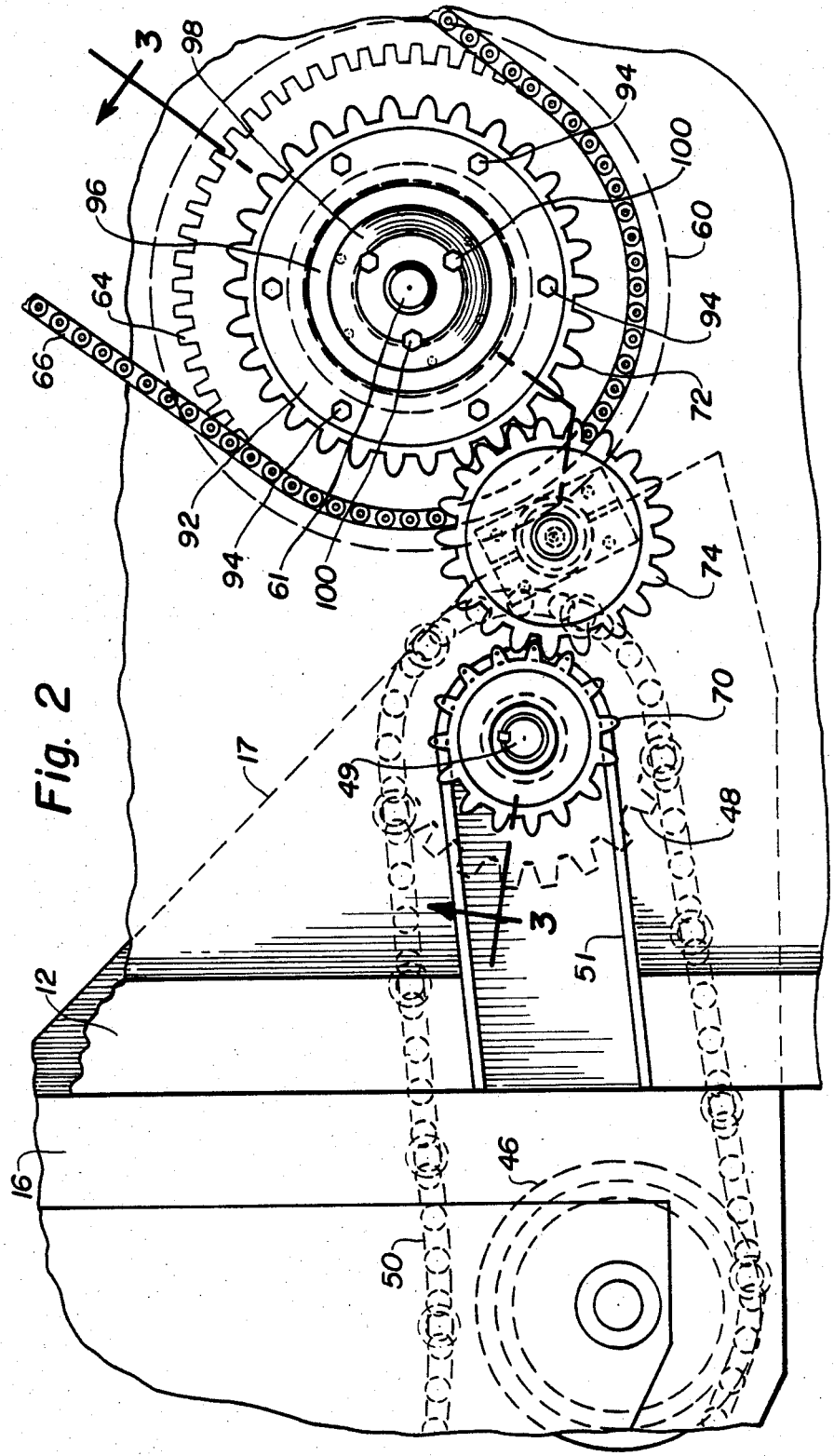
FIG. 2 is an enlarged view of a lower portion of the round baler of FIG. 1 showing some of the components of the apron tensioning system of the present invention.
Figure 4:
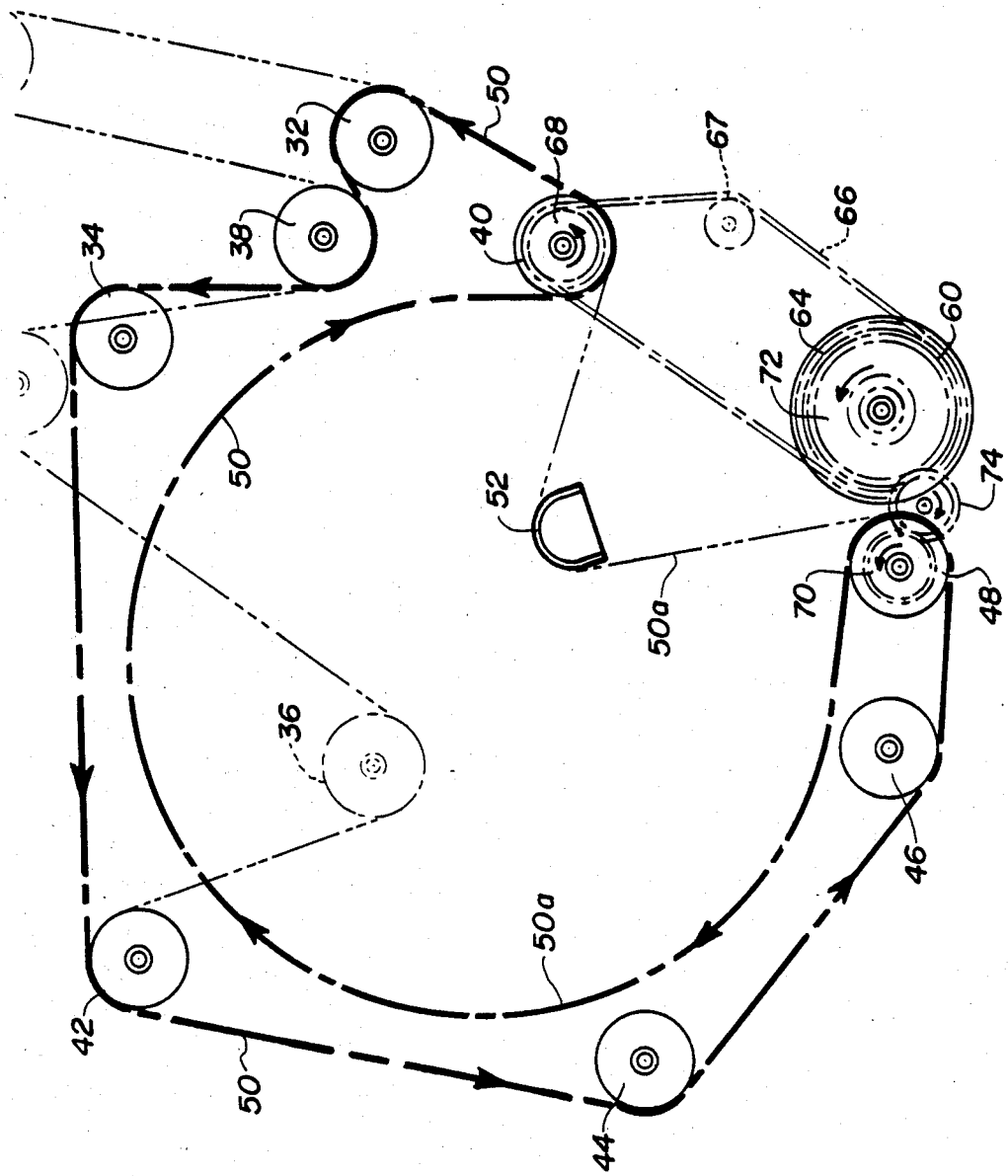
FIG. 4 is a schematic view of the round baler of FIG. 1 illustrating the relationship of various parts thereof during bale formation.

An arm assembly 26 is pivoted on the base frame 10 and includes front arms 28 carrying guide members 32,34 and rear arms 30 carrying guide members 36. Additional guide members 38 and drive sprockets 40 are carried on the base frame 10 while guide members 42,44,46 and drive sprockets 48 are carried on the auxiliary frame 16. As best seen in FIG. 2, sprockets 48 are rotatably mounted on forward extensions 17 of the auxiliary frame 16. A bale forming apron 50 is supported by the various aforementioned guide members and drive sprockets. The bale forming apron 50 preferably consists of a pair of endless chains connected together at spaced intervals along their length by transverse bars or slats. Cam guide members 52 are carried on the base frame 12 for supporting an inner course 50a of the apron 50 which extends between sprockets 40 and 48 in a bale starting position as seen in FIG. 4. Springs 54 are connected between levers 56 fixed to the arm assembly 26 and brackets 58 mounted on the base frame 12. The springs 54 serve to return the apron 50 to its bale starting position following formation and ejection of a roll bale. A floor roll 60 and a stripper roll 62 are provided on the base frame 12 to assist the apron 50 in bale formation.

According to the preferred embodiment of the present invention, a sprocket 64 fixed to shaft 61 of the floor roll 60 is connected by a chain 66 to a sprocket 68 fixed to the shaft on which the sprockets 40 are mounted. A gear 70 is fixed to an extension 49 of the shaft on which the drive sprockets 48 are mounted, and a gear 72 is coupled to the sprocket 64. The base frame 12 is provided with a cavity 51 for receiving the shaft extension 49. The gears 70 and 72 are connected by an idler gear 74 carried on the base frame 12. The sprockets 40 are driven by sheaves 76,78 and a belt 80 from a drive shaft 82 connected to the PTO of a tractor. The sprocket 64 is rotated by the sprocket 68 via the chain 66, and the gear 70 is rotated by the gear 72 via the idler gear 74. The rotation of the sprocket 64 causes the floor roll 60 to rotate, and the rotation of the gear 70 drives the sprockets 48 which together with the sprockets 40 cause movement of the apron 50 in a predetermined path. The gears 70,72,74 are sized for driving the sprockets 48 at a slightly slower speed than the sprockets 40.

Figure 3:
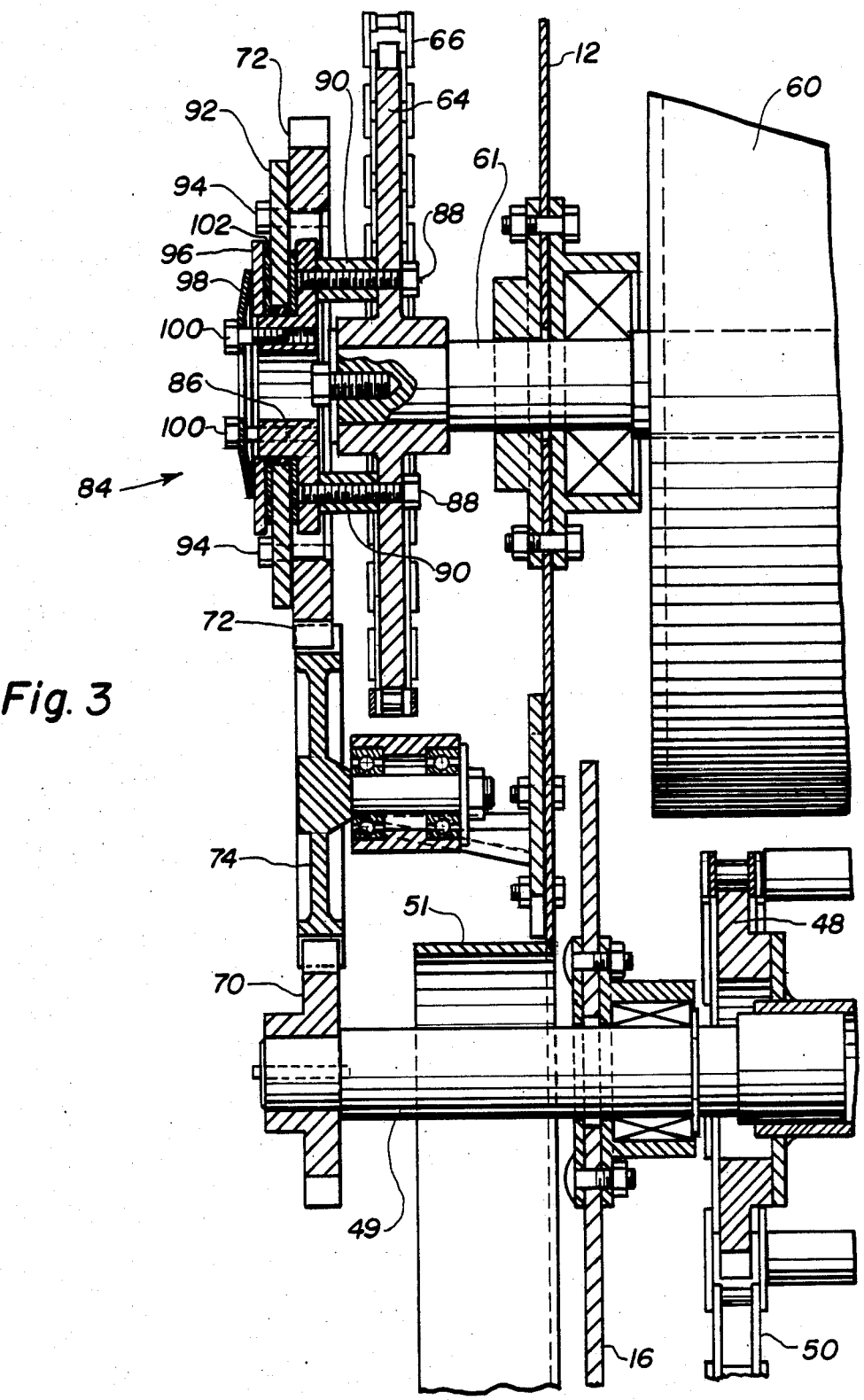
FIG. 3 is a sectional view taken along line 3—3 in FIG. 2.

Referring to FIGS. 2 and 3, it will be seen that the gear 72 is coupled to the sprocket 64 by a slip clutch assembly 84 including a hub 86 secured to the sprocket 64 by bolts 88 and spaced therefrom by spacers 90. A plate 92 is fastened to the gear 72 by bolts 94, and another plate 96 is held in engagement with the hub 86 by a soring washer 98 which is fastened to the hub 86 by bolts 100. Friction discs 102 are disposed between the plates 92 and 96 and between the plate 92 and the hub 86. The bolts 100 are tightened sufficiently to clamp the plate 92 between the friction discs 102 so that the plate 92 and the gear 72 will be rotated upon rotation of the sprocket 64. The discs 102 allow the plate 92 and the gear 72 to slip or become temporarily disengaged from rotation by the sprocket 64 whenever the gear 72 is overloaded.

In operation, the round baler 10 is towed across a field by a tractor and the pickup device 18 delivers crop material onto the upper surface of the rotating floor roller 60. The crop material is carried rearwardly by the floor roller 60 into engagement with the apron 50 which at the start of bale formation has the inner course 50a thereof extending, as seen in FIG. 4, generally upwardly from the sprockets 48 over the guide members 52 and then generally forwardly around the sprockets 40. As a bale is formed and increases in diameter, the inner course 50a of the apron 50 expands in length around the periphery of the bale. The expansion of the apron inner course 50a is permitted by rotation of the arm assembly 26 in a clockwise direction as viewed in FIG. 1. This clockwise rotation of the arm assembly 26 is not significantly resisted by the springs 54. Therefore, the springs 54 per se do not have any significant affect on the tension in apron 50 or on the density of bales formed in the round baler 10.

In accordance with the present invention, the inner course 50a of the apron 50 is maintained in tension during bale formation because the set of gears 70,72,74 tries to drive the sprockets 48 at a speed that is slightly slower than the speed at which the sprockets 40 are driven. This differential in speeds is preferably in the range of 1 to 2 rpm. When the speed differential between the sprockets 40 and 48 reaches a preset limit in the range of 1 to 2 rpm, the gear 72 becomes overloaded causing operation of the slip clutch assembly 84 to momentarily disengage the gear 72 from the sprocket 64 in the manner already described. The gear 72 remains disengaged from the sprocket 64 for only a very short period of time (e.g., 1 to 2 seconds) before being reengaged to drive the sprockets 48. Conversely, the gear 72 remains engaged with the sprocket 64 for a comparable short period of time (e.g., 1 to 2 seconds) before being disengaged again. This constant engagement and disengagement of gear 72 by the slip clutch assembly 84 controls the tension in the apron inner course 50a and thereby controls the density of bales formed in the round baler 10.

The limit at which the slip clutch assembly 84 is set for disengagement of the gear 72 from the sprocket 64 may be adjusted by loosening or tightening the bolts 100 which respectively decreases or increases the force clamping the plate 92 between the friction discs 102. It is important that all three of the bolts 100 be set at the same torque.

When it is desired to discharge a completed bale from the round baler 10, the auxiliary frame 16 is raised by the hydraulic cylinders 24 as indicated in phantom in FIG. 1. The raising of the auxiliary frame 16 causes the gear 70 which is carried on the shaft extension 49 to be disengaged from the idler gear 74. This allows ejection of the bale. As the auxiliary frame 16 is subsequently lowered, the springs 54 urge the arm assembly 26 to rotate in a counterclockwise direction as viewed in FIG. 1 thereby returning the apron 50 to the bale starting position shown in phantom in FIG. 4.

An important feature of the tensioning system of the present invention is that only the inner course 50a of the apron 50 is under maximum tension during bale formation while the remainder of the apron 50 is under minimum tension from the springs 54. This provides longer life for the apron chains and permits reductions in the structural components of the baler frame.

It will be understood that the present invention provides an apron tensioning system for round balers which eliminates the need for large, expensive spring assemblies such as disclosed in U.S. Pat. Nos. 4,343,141 and 4,426,833.

Having thus described the invention, what is claimed is:

1. In a roll baling machine having an apron for forming roll bales of crop material, said apron being formed of a pair of endless chains connected together at spaced intervals along the length thereof by transverse members, a system for tensioning said apron comprising:
   first and second pairs of drive sprockets engaging said chains for moving said apron in a predetermined path, said apron having an inner course thereof extending between said first and second pairs of drive sprockets, said inner course of said apron being expandable in length during bale formation;
   means for driving said first pair of drive sprockets at a first speed;
   means for driving said second pair of drive sprockets at a second speed which is slower than said first speed in order to maintain tension in said inner course of said apron; and
   clutch means for disengaging said means for driving said second pair of drive sprockets when the differential between the first and second speeds reaches a preset limit.

2. The system of claim 1, wherein said means for driving said first pair of drive sprockets is adapted for connection to the PTO of a tractor.

3. The system of claim 2, wherein said means for driving said second pair of drive sprockets is connected to said means for driving said first pair of drive sprockets.

4. The system of claim 3, wherein said means for driving said second pair of drive sprockets comprises a set of gears.

5. The system of claim 4, wherein said clutch means comprises a slip clutch connected to one gear of said set of gears for drivingly disconnecting said one gear from said means for driving said first pair of sprockets when the differential between said first and second speeds reaches said preset limit.

6. In a roll baling machine having an apron for forming roll bales of crop material, a system for tensioning said apron comprising:
   first and second drive members for moving said apron in a predetermined path, said apron having an inner course thereof extending between said first and second drive members, said inner course of said apron being expandable in length during bale formation;
   means for driving said first drive member at a first speed;
   means for driving said second drive member at a second speed which is slower than said first speed in order to maintain tension in said inner course of said apron; and
   clutch means for disengaging said means for driving said second drive member when the differential between said first and second speeds reaches a preset limit.

7. The system of claim 6, wherein said preset limit is in the range of 1 to 2 rpm.

* * * * *